Feb. 11, 1958     F. R. UPPERMAN     2,823,143
SPRAYING METHOD FOR APPLYING CATALYZED COATING COMPOSITIONS
Filed March 5, 1953
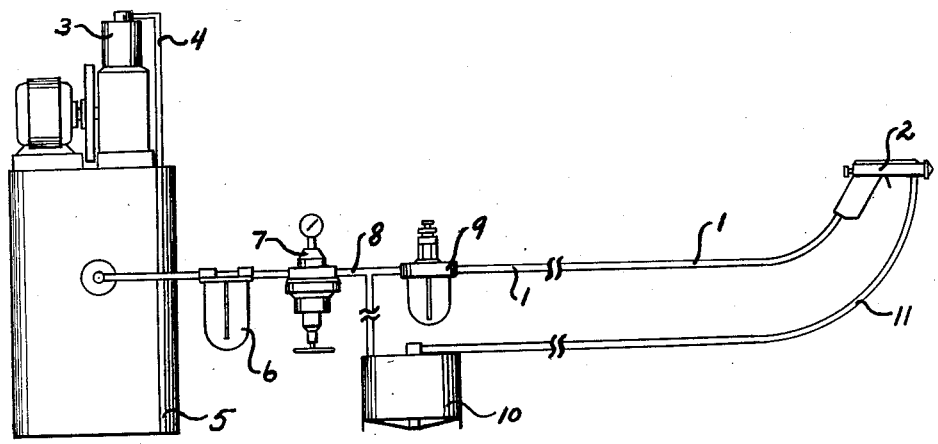
FRANCIS R. UPPERMAN
INVENTOR
BY G. G. Christensen
ATTORNEY

2,823,143

SPRAYING METHOD FOR APPLYING CATALYZED COATING COMPOSITIONS

Francis R. Upperman, Pennside, Pa., assignor to The Glidden Company, Cleveland, Ohio, a corporation of Ohio Application March 5, 1953, Serial No. 340,620

4 Claims. (Cl. 117—104)

This invention relates to a novel method and to novel apparatus for applying coating compositions which at the time of application are mixed with suitable catalyst(s).

Various coating compositions have been developed within recent years which require that one or more catalysts be thoroughly and accurately admixed with the composition at the time the coating is applied. Most of such coatings are applied by spraying. The usual single-nozzle spray gun was not deemed suitable for applying such coatings, and there soon appeared on the market a spray gun having two nozzles, one for spraying the coating and one for spraying catalyst into the atomized coating. I have found that such double-nozzle spray guns do not provide a satisfactory solution to the problem of spraying catalyzed coatings since the amount of catalyst cannot be uniformly proportioned to the quantity of coating which is sprayed out of the gun, and also since the catalyst does not appear to be dispersed homogeneously into the atomized coating. In my efforts to find a more satisfactory method for spraying catalyzed coatings, I found that the catalyst could be effectively introduced into a stream of compressed air, and that the resulting stream could then be passed into a conventional single-nozzle spray gun to simultaneously spray the coating and admix catalyst with the atomized coating.

Accordingly, it is an object of my invention to provide a novel method for spraying catalyzed coating compositions, said method being characterized by the improvement wherein the catalyst is admixed with a stream of compressed air which passes into a conventional single-nozzle spray gun.

It is another object to provide novel apparatus for carrying out the method described last above.

These and other objects will be apparent from the following description of my invention taken in conjunction with the attached single figure of drawings which illustrates the combination of equipment making up my apparatus and useful in practicing my method.

Referring now to the drawings, it will be seen that one embodiment of my apparatus comprises a compressed-air line 1, 1 which is attached to any conventional single-nozzle spray gun 2 of the type adapted for spraying coating compositions by means of compressed air. The compressed air in air-line 1 can originate from any suitable equipment such as a compressor 3. The compressed air from the compressor is preferably conveyed through suitable conduit 4 to a surge tank 5, a water and oil trap 6 and pressure regulator 7. The compressed air from regulator 7 can then be conveyed in suitable conduit 8 to a catalyst injector 9 wherein the stream of compressed air has mixed with it a suitable amount and type of catalyst. The catalyst-air mixture is then conveyed by air-line 1, 1 to the spray gun 2. It will be understood that the type of catalyst mixed with the compressed air by means of injector 9 is chosen to cooperate with the particular coating composition being sprayed from the spray-gun, and supplied in the embodiment shown from a tank 10 through hose 11. It will also be understood that the amount of catalyst mixed with the compressed air is capable of being varied by suitable adjustment of the mechanism which constitutes injector 9, and by adjustment of the coating composition to require or use more or less compressed air per unit volume of coating composition which is atomized.

Adjustable injectors are well-known articles of manufacture and can be secured in various sizes or capacities adapted for one's particular requirements in respect to amount of catalyst needed. While to the best of my knowledge such injectors have not been used heretofore for introducing catalyst(s) for coating compositions into an air-line, they have been used for introducing lubricants into compressed air lines. Such conventional lubricant injectors are functionally satisfactory for my purposes. Typical lubricant injectors are disclosed in U. S. Patents 1,782,741, 2,223,700 and 2,610,700. Since my invention is concerned with the adaptation of such injectors to my particular uses rather than with the details of their construction, I believe it is unnecessary for a clear understanding of my invention to describe the construction of a typical lubricant injector.

It should be understood, however, that conventional lubricant injectors, in some instances, may have been constructed of metals or other materials which may be corroded by, and hence are harmful to, particular coating catalysts. Such corrosion and/or chemical action may discolor the catalyst and/or impair or destroy its catalytic properties. Where such situations are found to exist, appropriate construction materials should be used in the various parts of the injector which contact the catalyst. Stainless steel is satisfactory for many catalysts, but since there are so many different coatings and coating catalysts which can be used in practicing my invention, even stainless steel may not be appropriate for all of them. Those skilled in the catalyzed coating art will have no difficulty in selecting construction materials which will be satisfactory for use with the particular catalyst at hand. What has been said here applies equally well to air-hose, conduits, and spray gun passageways which contact the catalyst-bearing compressed air.

It should also be noted that while I have shown only one catalyst injector in the attached drawings, there may arise situations in which two or more injectors are useful in injecting two or more different catalysts. For example, mixed catalysts may be found advantageous in some coating systems, but it may also be found desirable to vary the proportions of the catalysts from time to time. In order to provide for such variations, it may be desirable to provide one injector for each of the catalysts in the mixture, since the proportions can then be varied at will by adjusting either injector.

My method of spraying catalyzed coatings by introducing the catalyst(s) into the compressed air ahead of a single-nozzle spray gun can be applied to a wide variety of coatings. One broad class of coatings which can be sprayed by my method embraces coatings which do not form a film until mixed with an appropriate type and amount of catalyst, but when so mixed, form a film almost immediately. The so-called "polyester" (unsaturated alkyd resin) coatings are an example of this class. Upon catalysis with organic peroxides, diisocyanates or other specific catalysts and/or combinations of catalysts, promoters and accelerators, these liquid materials set rapidly to form good protective coatings. See U. S. Patent No. 2,606,162, granted August 5, 1952.

The "Epon" or epoxide-type coatings are another large class of catalyzed coatings which can be sprayed by the present method and apparatus. British Patent No. 681,099 describes such an epoxide coating; it is catalyzed for curing by means of small amounts of triethylamine. Other amine catalysts are, of course, well known.

Copolymer coatings in which styrene is one of the monomeric precursors, can be catalyzed for rapid curing by means of a variety of known catalysts, organic peroxides being commonly used.

The furfuryl alcohol-furfuraldehyde coatings of U. S. Patent No. 2,095,250 exemplify a group of coatings which can be cured with sulfuric acid or other dehydrating catalysts. As there indicated, furfuryl alcohol by itself can be catalyzed with such dehydrating catalysts to form resinous condensation products.

Other types of coatings which can be applied simultaneously with catalysts are:

Low bake and air-dry alkyd urea-aldehyde, melamine-aldehyde and triazine-aldehyde reaction products. By treatment with acid catalysts, conversion varnishes can be prepared from such products;

Urea-aldehyde, melamine-aldehyde and triazine-aldehyde reaction products, and mixtures thereof, can be plasticized by themselves without modification with alkyds to give varnishes or enamels which convert in the presence of acid catalysts;

Epoxy ester coatings;

Vinyl butyral coatings, such as wash primers catalyzed with phosphoric acid or other types of catalysts;

Heat reactive phenolic syrup coatings such as those described in U. S. Patent No. 2,623,865 and in the Schwartzberg application Serial No. 713,070, filed November 29, 1946, now Patent No. 2,636,017.

Hot spray enamels to which small proportions of drier are added at the spray nozzle to reduce darkening effects of the drier when constantly exposed to heat, and to reduce skinning;

Catalyzed air-drying neoprene coatings such as are currently being produced for use in tank linings and the like;

Emulsion coatings.

It should be understood that the present inventions are concerned with the spraying of coatings which in the absence of curing catalysts, remain liquid. Some coatings of this type, when catalyzed, can be cured at room temperatures, others cure so slowly at room temperatures that they are usually heated in a baking oven to a temperature at which curing occurs at a desired rate of speed. The latter types are formulated to have the properties which enable the uncured sprayed coating composition to form a wet film which will not run or sag prior to completion of the baking operation. Such aspects are of course within the ability of those skilled in the art, and are not properly a part of the present invention, and hence need not be explained further here. It should also be understood that while the present invention is concerned primarily with effecting an improved dissemination of catalyst(s) into coating compositions, other liquid materials such as inhibitors, promoters, accelerators and driers can be disseminated by the same method and apparatus either by themselves or along with curing catalysts. In any event, the liquid materials introduced into the compressed air stream in accordance with the invention must be usable in quantities which can be introduced into the compressed air without saturating the air. Preferably the amount of liquid should be considerably below the saturation level so that there is little danger of separation from the air-stream at any point in the air-line between the injector(s) and the spray gun.

It will be apparent that in carrying out the method of the present invention, the catalyst or other liquid conveyed in the compressed air should preferably not contact the coating composition which is being sprayed at any point ahead of the atomizing nozzle of the gun. In the larger tank-type industrial guns, the coating is usually supplied to the gun through a separate hose, and in such equipment, the catalyst-bearing compressed air should preferably not be used to apply pressure to the coating tank since otherwise enough catalyst may enter the tank to cause some conversion of the coating or at least to cause skinning due to conversion of the surface of the coating contained in the tank. In the smaller force-feed hand guns which carry a supply of coating in a container which is a rigid part of the spray gun, if skinning or undue conversion occurs in the coating a separate non-catalyst-bearing supply of compressed air can be provided for forcing the coating out of the container and up to the nozzle of the gun. I have found, however, that this is usually unnecessary because the compressed air reaching the chamber over the coating is relatively stagnant as long as the air-line pressure remains constant. Hence only a small amount of catalyst actually contacts the coating. When the gun is in intermittent service, however, more catalyst may contact the coating composition, and may lead to some conversion if the latter is capable of curing at the ambient room temperatures.

It will be understood that my described method can be practiced by employing any suitable compressed fluid in place of compressed air. Steam, for example, is satisfactory for the customary hot-spray coating compositions, and catalysts which are not harmed by contact with steam can be introduced into the steam line in the same manners described hereinabove.

Having now described my invention, what I claim is:

1. The method of curing and rapidly developing film-forming properties in an organic liquid coating composition of the type which exhibits substantially no film-forming properties until mixed with liquid catalyst of appropriate kind and critical small amount, said method comprising the step of projecting said liquid coating composition in atomized form from the nozzle of a single-nozzle spray gun solely by means of compressed gas carrying the needed liquid catalyst homogeneously dispersed therein in amounts sufficient to supply all of the catalyst required to cure the entire quantity of coating composition which is atomized per unit of time from said nozzle by the compressed gas which issues from said nozzle in the same unit of time.

2. The process as claimed in claim 1 wherein the liquid coating composition contains an unsaturated alkyd resin as the principal potential film-forming material therein, and wherein the catalyst is a material selected from the group consisting of organic peroxides, diisocyanates and mixtures thereof.

3. The process as claimed in claim 1 wherein the liquid coating composition contains an epoxy resin as the principal potential film-forming material therein, and wherein the catalyst consists of at least one organic amine.

4. The process as claimed in claim 1 wherein the liquid coating composition contains as the principal, potential film-forming material therein at least one aldehyde reaction product selected from the group consisting of urea-aldehyde, melamine-aldehyde, and triazine-aldehyde reaction products, and wherein the catalyst is an acid.

References Cited in the file of this patent

UNITED STATES PATENTS

| | | |
|---|---|---|
| 1,395,569 | Hartman | Nov. 1, 1921 |
| 1,935,977 | Geer | Nov. 21, 1933 |
| 2,195,362 | Ellis | Mar. 26, 1940 |
| 2,255,189 | Robinson et al. | Sept. 9, 1941 |
| 2,277,083 | Dorough | Mar. 24, 1942 |
| 2,309,090 | Bauer | Jan. 26, 1943 |
| 2,310,633 | Heimburger | Feb. 9, 1943 |
| 2,450,503 | Drummond | Oct. 5, 1948 |
| 2,501,839 | Bodle et al. | Mar. 28, 1950 |
| 2,543,517 | Anderson | Feb. 27, 1951 |
| 2,631,138 | Danneuberg | Mar. 10, 1953 |
| 2,643,243 | Danneuberg | June 23, 1953 |

FOREIGN PATENTS

| | | |
|---|---|---|
| 566,543 | Great Britain | Jan. 3, 1945 |
| 136,176 | Australia | Feb. 1, 1950 |